US 6,700,063 B2

(12) United States Patent
Shotey et al.

(10) Patent No.: US 6,700,063 B2
(45) Date of Patent: *Mar. 2, 2004

(54) HORIZONTAL AND VERTICAL MOUNTABLE WEATHERPROOF COVER PLATE

(75) Inventors: Michael J. Shotey, Scottsdale, AZ (US); Marcus J. Shotey, Scottsdale, AZ (US); Edgar W. Maltby, Mesa, AZ (US)

(73) Assignee: TayMac Corporation, Gilbert, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/128,938

(22) Filed: Apr. 23, 2002

(65) Prior Publication Data

US 2002/0112873 A1 Aug. 22, 2002

Related U.S. Application Data

(63) Continuation of application No. 10/015,731, filed on Nov. 1, 2001, which is a continuation-in-part of application No. 09/456,089, filed on Dec. 6, 1999, now Pat. No. 6,420,653, and a continuation-in-part of application No. 09/657,352, filed on Sep. 7, 2000, now Pat. No. 6,441,307.

(51) Int. Cl.[7] ................................................. H05K 5/03
(52) U.S. Cl. ............................ 174/67; 174/66; 220/241
(58) Field of Search ................................ 174/67, 66, 53; 220/241, 242, 3.8, 3.3; 439/139, 165

(56) References Cited

U.S. PATENT DOCUMENTS

| 2,916,733 | A |   | 2/1959  | Hirsch         |         |
|-----------|---|---|---------|----------------|---------|
| 3,252,611 | A |   | 5/1966  | Weitzman et al.|         |
| 3,491,327 | A |   | 1/1970  | Tait et al.    |         |
| 3,895,179 | A |   | 7/1975  | Wyatt          |         |
| 3,954,179 | A | * | 5/1976  | Warmath        | 206/528 |
| 4,083,618 | A |   | 4/1978  | Busch, Jr.     |         |
| 4,197,959 | A |   | 4/1980  | Kramer         |         |
| 4,342,493 | A |   | 8/1982  | Grenell        |         |
| 4,424,407 | A | * | 1/1984  | Barbic         | 174/67  |
| 5,162,612 | A |   | 11/1992 | Naka et al.    |         |
| 5,272,281 | A |   | 12/1993 | Bouley         |         |
| 5,837,933 | A | * | 11/1998 | Fligelman      | 174/50  |
| 6,133,531 | A |   | 10/2000 | Hayduke et al. |         |
| 6,355,880 | B1| * | 3/2002  | Bateson et al. | 174/67 X|
| 6,361,361 | B1| * | 3/2002  | Henry          | 174/67 X|
| 6,420,654 | B1| * | 7/2002  | Shotey et al.  | 174/66  |
| 6,476,321 | B1| * | 11/2002 | Shotey et al.  | 174/67  |

OTHER PUBLICATIONS

TradeMaster Weatherproof While–in–Use Covers, Pass & Seymour, 4/99.
Carlon In–Use Weatherproof Covers, Carlon Electrical Products, 5/94.

* cited by examiner

Primary Examiner—Dhiru R Patel
(74) Attorney, Agent, or Firm—Schmeiser, Olsen & Watts LLP

(57) ABSTRACT

A weatherproof cover plate which may be installed horizontally and vertically is disclosed. In a weatherproof flat cover plate, an apron is provided to offer a water shield along at least two sides of the cover plate base. Additionally, a continuous ridge on the base is disclosed in association with a gasket and a biased hinge to provide additional protection against the weather. A novel locking clip is also disclosed. In a weatherproof bubble cover plate, a biased hinge is provided to bias the lid closed upon the base. Additionally, one or more cord catches in the base and removable knockouts in the lid are disclosed.

14 Claims, 13 Drawing Sheets

HORIZONTAL AND VERTICAL MOUNTABLE WEATHERPROOF COVER PLATE

RELATED APPLICATION

This application is a continuation of application Ser. No. 10/015,731 filed Nov. 1, 2001, which is a continuation-in-part of the earlier patent application by Shotey et al. entitled "Base for Electrical Outlet and Related Method," Ser. No. 09/456,089, filed Dec. 6, 1999 now U.S. Pat. No. 6,420,653, and of the earlier patent application by Shotey et al. entitled "Universal Cover Plate," Ser. No. 09/657,352, filed Sep. 7, 2000 now U.S. Pat. No. 6,441,307, the disclosures of which are hereby incorporated herein by reference.

BACKGROUND OF THE INVENTION

1. Technical Field

This invention generally relates to electrical outlets and, more particularly, to a weatherproof cover plate for an electrical outlet configured to be mountable in both horizontal and vertical orientations by providing a biased hinge and weatherproofing features

2. Background Art

Cover plates for electrical devices have been used extensively for many years. The general construction, operation and usefulness of cover plates are well known in the art. Cover plates are generally categorized as either flat cover plates or bubble cover plates. Several examples of cover plates are shown and described in U.S. Pat. No. 5,763,831 to Shotey et al. (Jun. 9, 1998) and U.S. Pat. No. 5,527,993 to Shotey et al., the disclosures of which are hereby incorporated herein by reference. Varieties of each of these two styles of cover plates are known to be made weatherproof by manufacturers for use outside or in extreme conditions. Weatherproof cover plates, as they are known in the art and approved by the Underwriters Laboratories ("UL"), are cover plates for electrical devices or outlets which self close when mounted and, when closed, resist water from reaching the electrical device or outlet protected by the cover plate sufficient to meet and pass the testing standards established by UL. Weatherproof cover plates are conventionally designed and sold for either horizontal or vertical mounting, and not for both. This requires cover plate installers and suppliers to maintain stock of both horizontal and vertical weatherproof cover plates.

Conventional bubble cover plates are designed so that the weight of the cover plate lid closes the lid against the base of the cover plate. Accordingly, bubble cover plates are designed and installed so that the hinges for the lid are along the upper edge of the cover plate when mounted so that gravity pulls the lid shut in compliance with the UL standard. For additional weatherproofing protection, a portion of the lid of a bubble cover plate is conventionally sized and shaped to overlap a portion of the base.

Conventional flat cover plates comprise a base for mounting to an outlet box, a lid hingedly mounted to the base, and a gasket associated with the lid so that when the lid is closed against the base, the gasket contacts the base to resist water flow to the electrical components under the lid. For f6lat cover plates, because the lids are generally smaller and of lighter weight than those of bubble cover plate lids which are closed by gravity, and because the thin profile of a flat cover plate is less conducive to a latch, some form of a spring or other biasing device is used to force the lid closed to press and maintain the gasket against the base. Without the spring, the lighter lids are subject to being blown open by the wind or to remaining slightly open thereby exposing the electrical outlet to the weather. Again, however, because UL requires that the lid keep water from the electrical outlet protected by the cover plate, flat cover plates are conventionally designed and approved to be installed either horizontally or vertically and not both.

Thus, there is a need for both a weatherproof flat cover plate and a weatherproof bubble cover plate in the art which is approved for and may be installed both horizontally and vertically.

DISCLOSURE OF THE INVENTION

The present invention relates to embodiments of weatherproof cover plates which are installable in both the horizontal and vertical orientations. For embodiments of a weatherproof flat cover plate, an apron is disclosed which extends from at least two sides of the flat cover plate base to reflect water thereon from the base. For additional protection against the weather, the apron may be angled with respect to the base, a continuous ridge may extend above the base, and the lid may include a gasket and a biased hinge so that the biased hinge presses the gasket against the continuous ridge to create a barrier against water passing over the ridge. A removable locking clip which secures itself to the base may be used to assist in securing the lid against the base. For embodiments of a weatherproof bubble cover plate, a biased hinge is used to bias the lid closed upon the base. Embodiments of the bubble cover plate also include one or more cord catches in the base and removable knockouts in the lid to accommodate a cord attached to an electrical device or outlet within the cover plate to extend to outside the cover plate.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
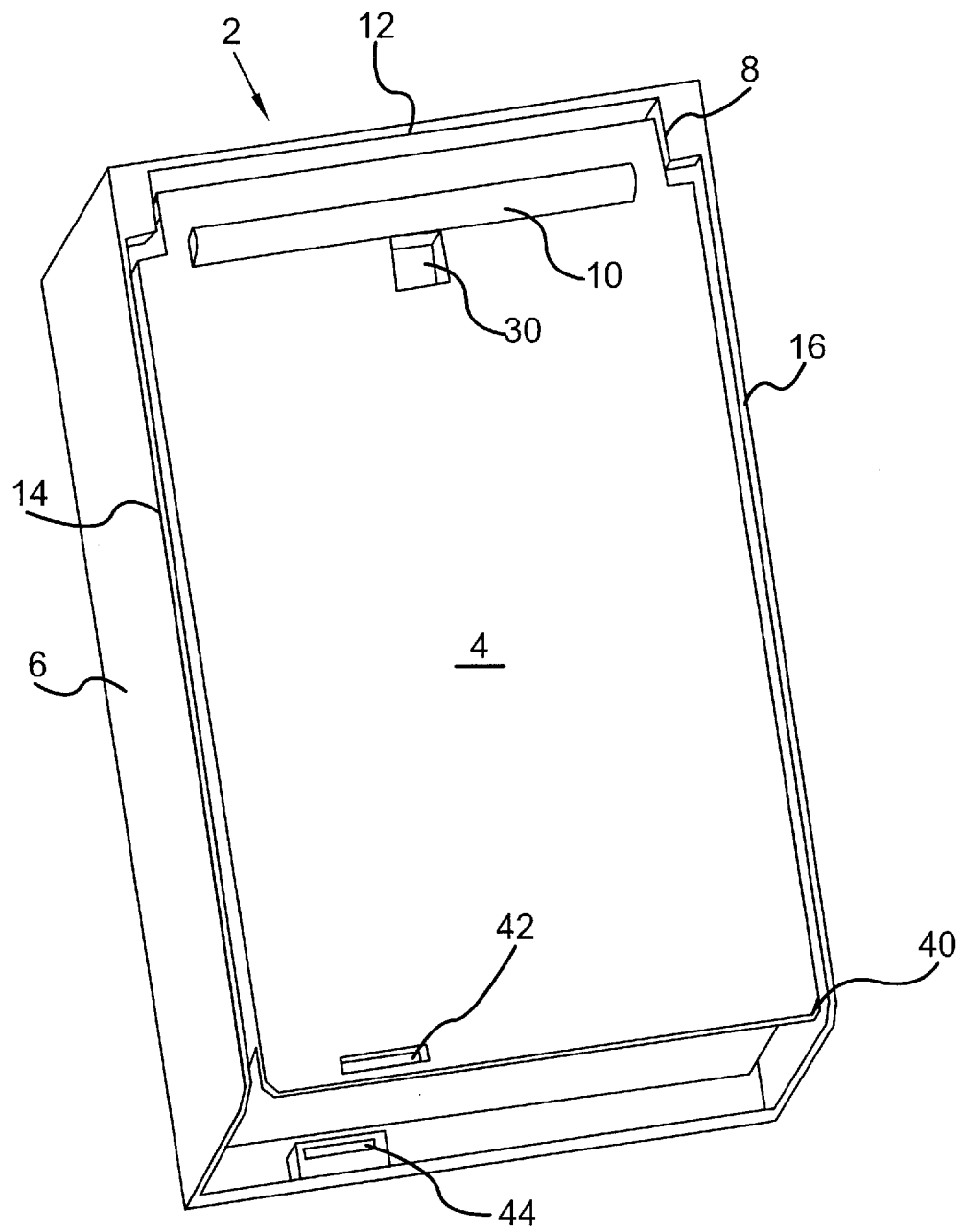
FIG. 1 is a perspective view of a flat cover plate configured according to an embodiment of the invention.

As discussed above, embodiments of the present invention relate to weatherproof cover plates which may be selectively mounted in both the horizontal and vertical orientations. Referring to FIGS. 1–5, illustrating an embodiment of a flat weatherproof cover plate 2, the flat cover plate 2 generally includes a lid 4 and a base 6. The lid 4 is hingedly coupled to the base 6 by a biased hinge 8 in this embodiment, though a biased hinge is not required in all embodiments. The biased hinge 8 continuously biases the lid 4 into a closed position such as is shown in FIG. 1 using biasing elements 36 best shown in FIGS. 3–5. The lid 4 includes a stop 10 for preventing the lid 4 from opening beyond a desired angle by coming in contact with a first side 12 of the base 6 when the lid 4 is in an open position. As will be clear to one of ordinary skill in the art, the particular configuration and structure of the biased hinge is not crucial to the invention and any of the many hinge configurations known in the art combined with a biasing device, such as a coil spring, band spring, elastic member pulling the lid shut, and the like, are sufficient to practice the invention.

Figure 2:
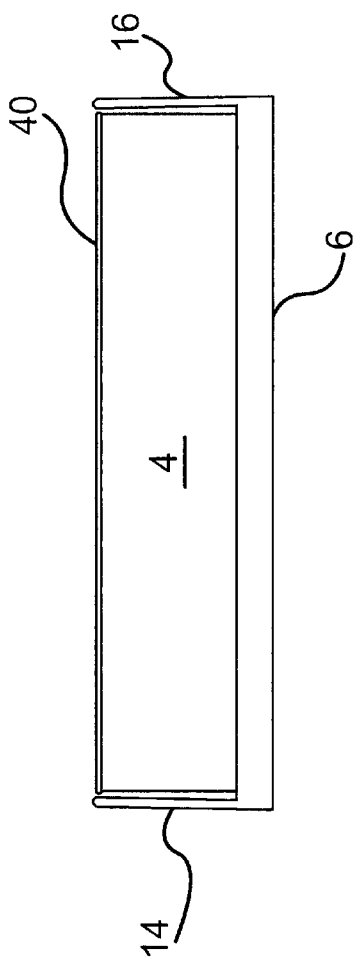
FIG. 2 is an end view of the flat cover plate of FIG. 1 as seen along view lines 2—2 of FIG. 1.
Figure 5:
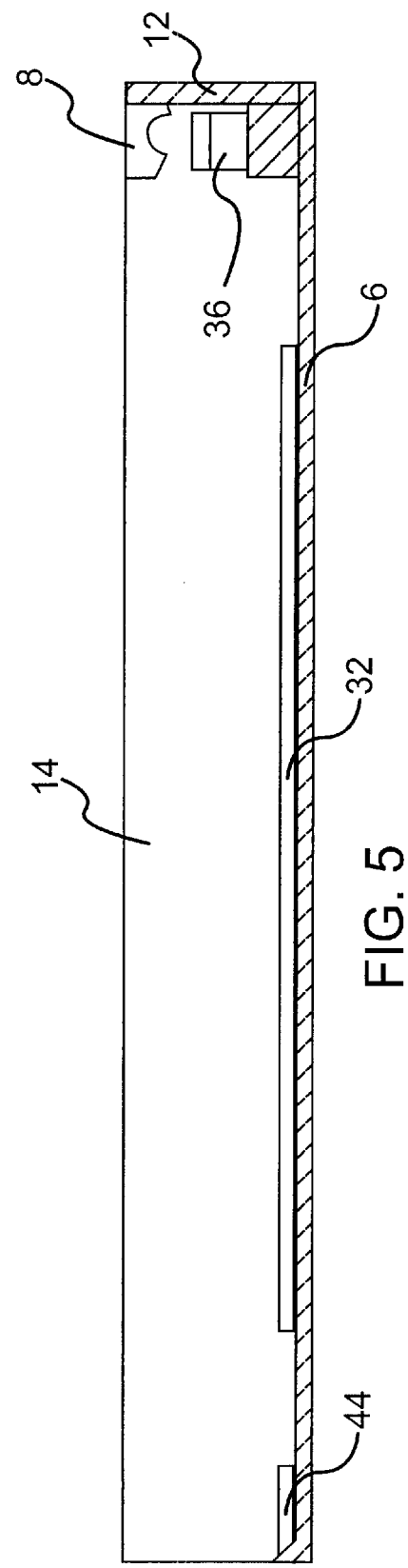
FIG. 5 is a view of the base of the embodiment of FIG. 1 as seen along view lines 5—5 of FIG. 4.

In the embodiment of the flat cover 2 shown in FIGS. 1–5, an apron extends from the base 6 along three sides 12, 14 and 16. The apron in this embodiment does not include any openings therein which would allow water to flow into the base. The apron, as shown in FIG. 2, may be configured to angle toward the lid 4 slightly to cause any water on the apron to flow away from the base 6 when the cover plate 2 is mounted to a box. By only slightly angling the apron toward the lid, water may flow from the apron, but the lid 4 can still close against the base 6 while being seated within the apron. An angle of between 1 and 15 degrees is sufficient. It is contemplated that in embodiments of the invention, the apron will be included along only two adjacent sides of the base 6. By including the additional weather protection provided by an apron on two adjacent sides, the cover plate 2 may still be installed in both a vertical and a horizontal orientation and have an apron along an upper edge of the installed cover plate.

Figure 3:
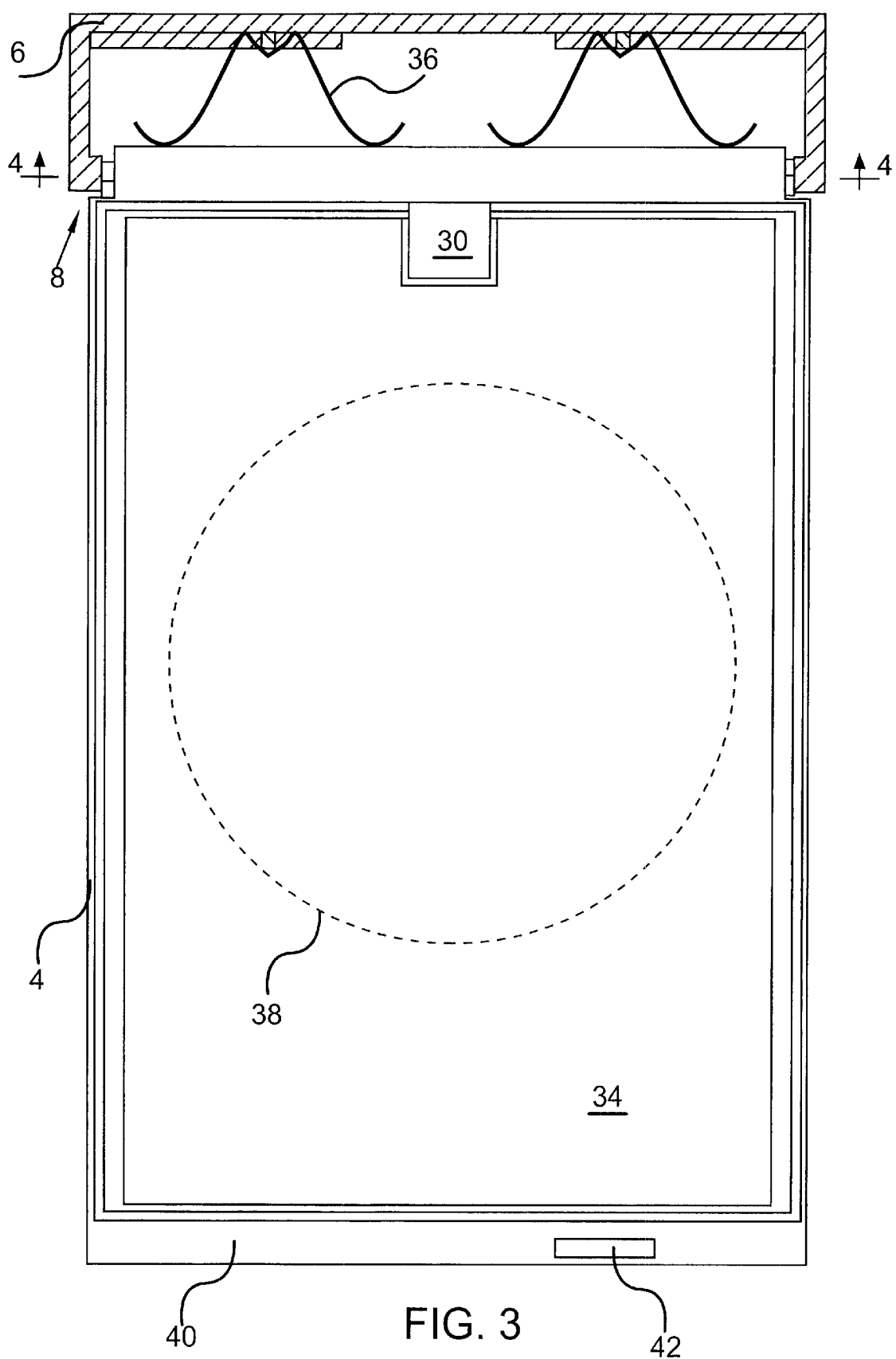
FIG. 3 is a view of the flat cover plate embodiment of FIG. 1 as seen with the lid open when viewed along lines 3—3 of FIG. 4.
Figure 4:
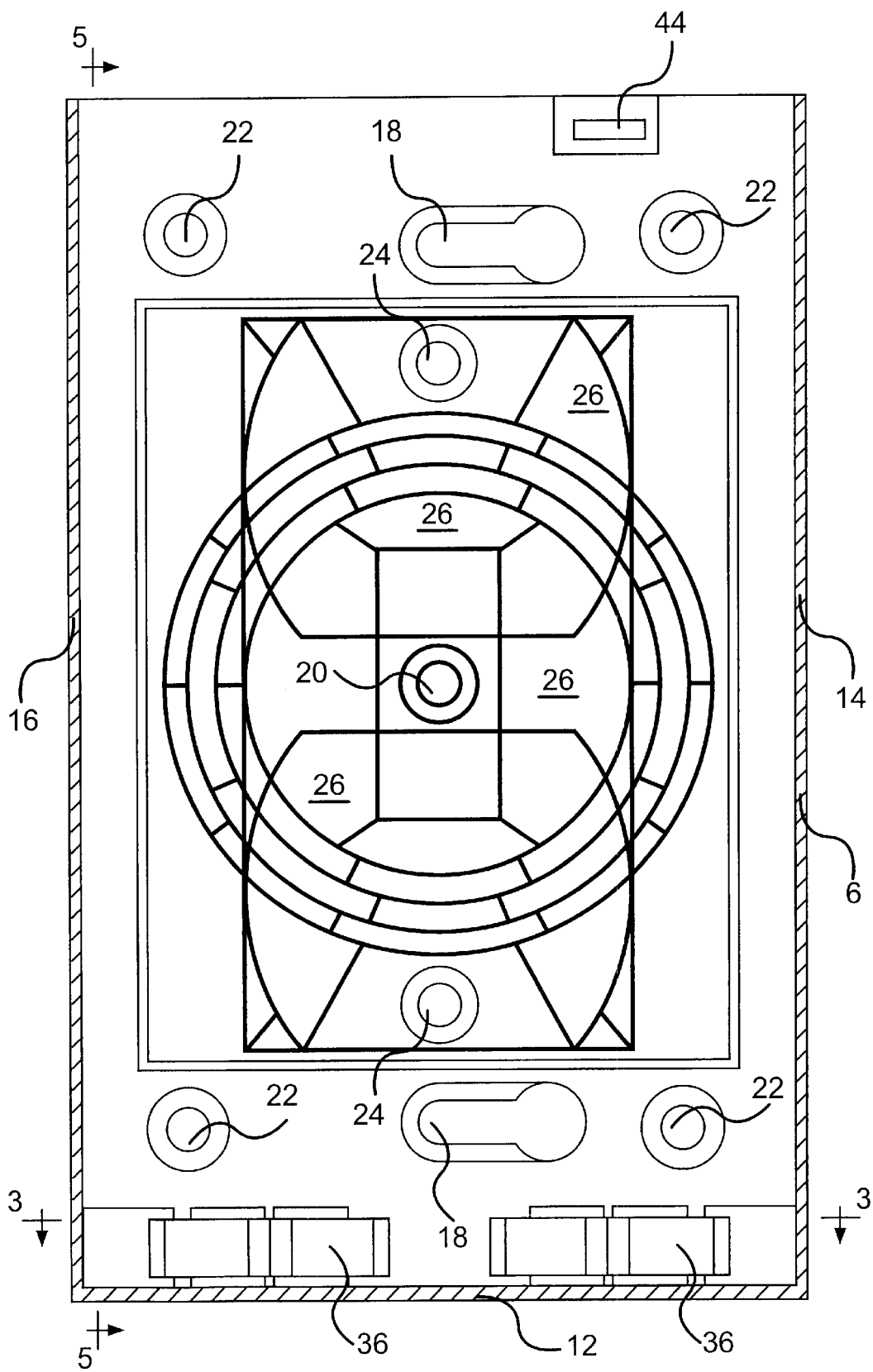
FIG. 4 is a view of the inside of the base of the embodiment of FIG. 1 as seen along view lines 4—4 of FIG. 3.

As shown in FIG. 4, which illustrates the base 6 of the cover plate 2 as viewed along line 4—4 of FIG. 3, the base 6 of the illustrated embodiment of the invention includes a plurality of mounting screw apertures 18, 20, 22 and 24 for alternatively mounting the cover plate 2 to a plurality of different configurations of electrical boxes for applying the cover plate 2 to a wider variety of electrical outlets and devices. Knock-out elements 26 in the base may be selectively removed in the present embodiment shown in FIG. 4 to adaptively receive a duplex outlet, a ground fault circuit interrupt (GFCI) outlet, a plurality of round outlet sizes, and a single pole double throw switch. The manipulation and function of the knock-out elements 26 is more fully shown and described in the previous patent application Ser. No. 09/657,352 entitled "Universal Cover Plate", the disclosure of which was previously incorporated herein by reference. By coupling the versatility of applying this cover plate to a wide variety of outlets with the ability to mount this outlet in both the vertical and horizontal orientations and still meet the UL testing standards for weatherproof safety, this single cover plate may be used in place of an even wider variety of weatherproof cover plates presently used in the art.

As is also shown in FIG. 4, the base of the present invention may include keyhole mounting screw holes or "slots" 18 to simplify installing of the cover plate. Each keyhole slot 18 includes a first aperture large enough for a screw head to pass through, and a second aperture having a diameter smaller than a screw head. The second aperture is aligned with a mounting screw hole in an electrical box. The use and function of keyhole slot apertures with electrical outlet bases is more fully shown and described in the previous patent application Ser. No. 09/456,089 entitled "Base for Electrical Outlet and Related Method," the disclosure of which was previously incorporated herein by reference. While the embodiment of the invention shown in FIG. 4 shows the keyholes slots 18 in a location for aligning with the electrical box screws of a duplex outlet, it is contemplated that any of the other mounting screw holes may be substituted with a keyhole slot for use with embodiments of the present invention.

Another feature of the embodiment of the invention shown in FIGS. 1–5 for simplifying installation of all cover plates, and particularly biased hinge cover plates, is the opening 30 in the lid 4 shown best in FIGS. 1 and 3. In conventional installation of biased hinge cover plates, it is particularly difficult to align the base with the electrical box and screw the box mounting screw through the base mounting screw aperture closest the biased hinge while the biased hinge is forcing the lid closed. This is particularly difficult for duplex weatherproof outlets. By providing openings 30 in the lid 4 of a cover plate 2 which each align with a box mounting screw aperture 18 in the base 6, the lid may be closed for all or a portion of the mounting of the base 6 to the electrical box.

The opening 30 in the lid 4 may be configured large enough to insert the screw threads and head without opening the lid, or may be sized such that the screw may be started with the lid open, and tightened with the lid closed. Furthermore, this opening 30 is particularly useful when combined with the use of a keyhole slots 18. For example, to install the cover plate 2 shown in FIGS. 1–5, a box mounting screw may be started into an electrical box and tightened to a point where only a portion of the screw threads are not inserted into the box mounting screw hole. Thereafter, the keyhole slots 18 may be placed over the box mounting screws and slid into place so that the second, smaller aperture of each of the keyhole slots 18 is aligned with the box mounting screw head. With the lid closed, the box mounting screw closest to the hinge 8 may be tightened through opening 30 in the lid 4. If a second opening is not provided for the box mounting screw farthest from the hinge 8, the lid may then be opened to partially tighten that screw. Because it is most difficult to tighten the box mounting screw closest to the hinge 8, it is most useful to have an opening 30 aligned with the mounting screw aperture in the base corresponding to that screw. However, embodiments of the invention may include openings for any or all of the mounting screw apertures in the base.

The use of keyhole slots 18 for installing a weatherproof cover plate is particularly useful because the lid of the weatherproof cover plate tends to interfere with inserting the screws into the box screw holes through the base. By providing keyhole slots 18 in the base, whether or not the lid includes openings 30 therethrough for accessing the mounting screw apertures 18, the mounting screws may be partially mounted onto an outlet box and then the cover plate can be placed on the outlet box without struggling with the lid while starting in the mounting screws into the appropriate holes in the electrical box. Once the screws are started into the electrical box, it is much easier to finish screwing them in despite interference with the lid. The mounting screws can be completely tightened from inside the lid, or through an opening 30 in the lid.

For the particular embodiment shown in FIGS. 1–5, a continuous ridge 32 extends from the base 6 surrounding the portion of the base through which the outlet will extend when the base 6 is installed on an electrical box. The ridge 32 of the present embodiment is approximately 2 mm high, though taller and shorter ridges are contemplated and may be required depending upon the strength of the bias in closing the lid and other characteristics which will be clear to those of ordinary skill in the art from this disclosure. The continuous ridge 32 provides an additional weatherproof feature of the present embodiment in conjunction with a gasket 34 associated with the lid 4. When the lid 4 is pressed closed by the biasing hinge 8, the gasket 34 presses against the continuous ridge 32 extending from the base 6 to resist water flow thereacross. By placing the ridge 32 inwardly of some of the box mounting holes 18 and 22, the ridge and gasket combination also provides additional protection to isolate the outlet openings from the box mounting holes 18 and 22 and prevent water from seeping through those holes 18 and 22 into the electrical workings of the box while the lid is closed. When the cover plate 2 is mounted to an electrical box, the mounting holes 20 and 24 within the ridge are each either filled with a screw or in communication with the electrical box and, therefore, will not pose a threat of water seeping therethrough to the electrical devices protected by the cover plate 2.

Figure 20:
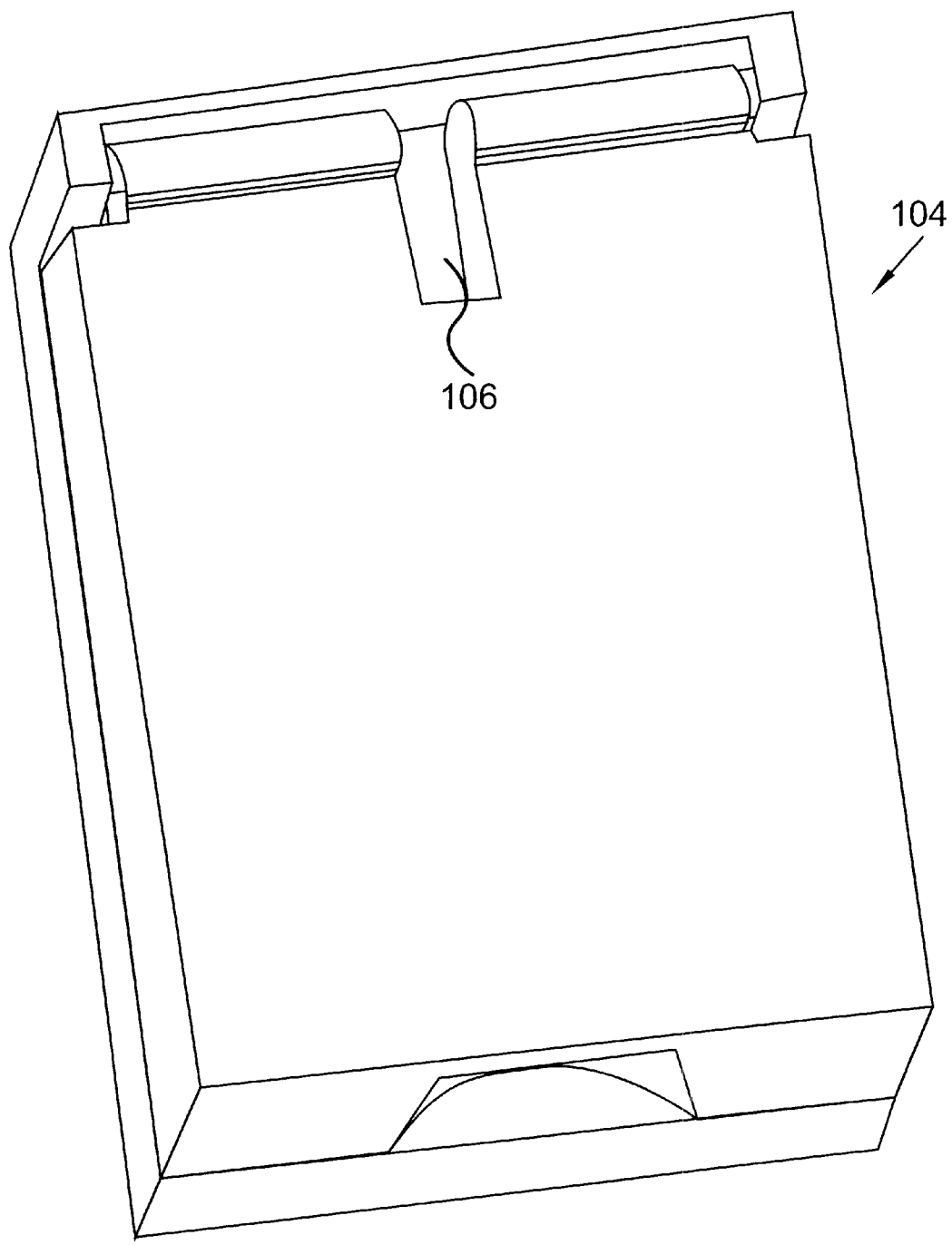
FIG. 20 is a perspective view of a flat weatherproof cover plate without an apron.

The thickness and resilience of the gasket 34 in the lid 4 and the bias elements 36 in the hinge 18, and the height of the ridge 32 determine how effectively the ridge and gasket combination keeps water from crossing the barrier formed when the lid 4 is in its closed position against the base. It is also contemplated that in particular embodiments of the invention, such as the embodiment of a cover plate 104 shown in FIG. 20, the apron extending from the base 6 will not be necessary to reflect water from the base in a weatherproof horizontal and vertical mountable cover plate because the ridge and gasket combination provides a sufficient barrier to water flow. Note that the opening 106 in the lid of the embodiment shown in FIG. 20 extends to an edge of the lid. So long as the opening 106 is placed outside the ridge and gasket seal, water does not pass to the electrical outlet or device protected by the lid. The gasket 34 may also include punch-out sections, such as the round punch-out section indicated by dashed line 38 in FIG. 3, to accommodate electrical devices which extend through the base farther than the ridge and may cause interference to the lid 4 closing.

Figure 6:
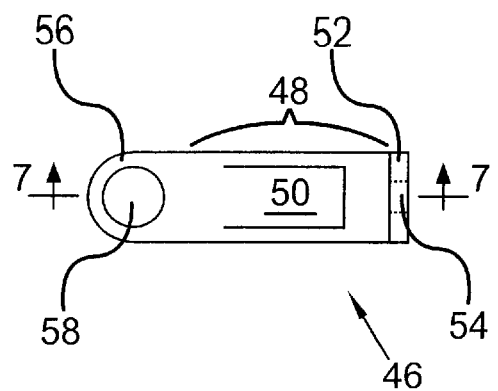
FIG. 6 is a front view of a locking clip configured according to an embodiment of the present invention.
Figure 7:
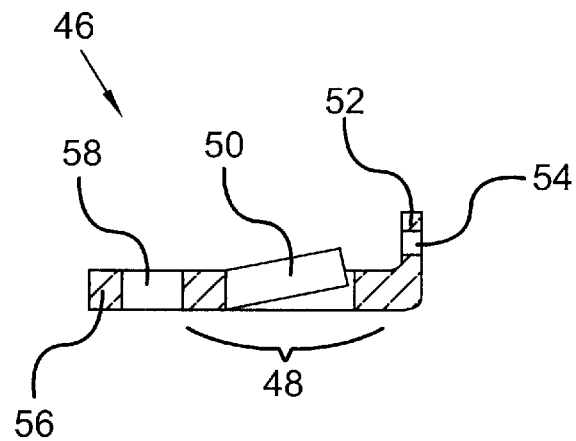
FIG. 7 is a cutaway side view of the clip of FIG. 6 as seen along view lines 7—7 of FIG. 6.

In particular embodiments of the invention, the lid 4 may also include an extension 40 to provide a handle by which the lid 4 may be more easily opened. The embodiment of the invention shown in FIGS. 1–5 also includes a locking clip aperture 42 in the lid 4 and a corresponding and aligned locking clip aperture 44 in the base 6. A novel locking clip 46 is disclosed in FIGS. 6–8 which includes an elongated body portion 48 having a raised latching section 50, a restraining end 52 having an aperture 54 therethrough, and a locking end 56 having a locking aperture 58 through which a padlock, locking pin, or other mechanism may be used to secure the lid to the base. Aperture 54 is not required for the general operation of the clip.

Figure 8:
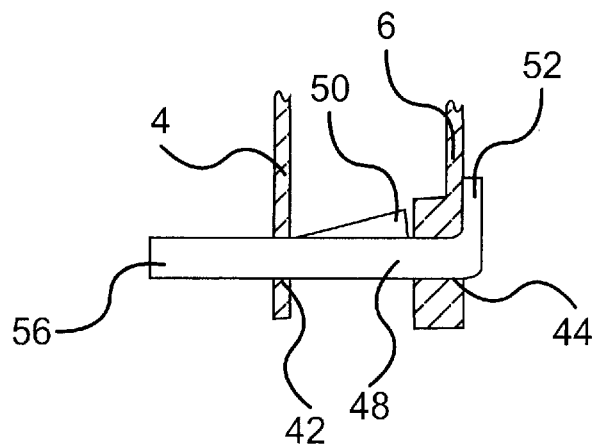
FIG. 8 is side view of the clip of FIG. 6 shown coupled to a lid and base of a flat cover plate.

To install the locking clip 46, the locking end 56 is inserted into the locking clip aperture 44 in the base 6 and then through the locking clip aperture 42 in the lid 4 so that the elongated body portion 48 of the locking clip 46 extends through both locking clip apertures 42 and 44. The raised latching section 50 is flexibly coupled to the elongated body portion 48 such that when the elongated body portion is inserted into the locking clip apertures 42 and 44, the raised latching section 50 flexes into alignment with the remainder of the elongated body portion 48 until it completely passes through the locking clip aperture 44 in the base. As shown in FIG. 8, once the raised portion 50 passes through the locking clip aperture 44 in the base, it returns to its original position to prevent the locking clip 46 from slipping back out of the locking clip aperture 44. The restraining end 52 of the locking clip 46 prevents the locking clip 46 from completely passing through the locking clip aperture 44 by coming into contact with the base 6. The restraining end 52 may be oriented either toward the edge of the base 6, or toward the center with equal effectiveness. If directed toward the edge of the base 6, the aperture 54 in the restraining end may be used to assist in locking the lid 4 to the base 6.

In particular embodiments of the locking clip 46, the elongated body portion 48 is provided with the length needed for the locking end 56 of the locking clip 46 to extend beyond the lid 4 and allow the lid to be locked through the locking aperture 58 with a padlock, pin or other locking mechanism, but not so long as to prevent the lid 4 from opening when the locking clip is in place. To remove the locking clip 46 from the cover plate, an operator may press or squeeze the raised portion 50 back into alignment with the elongated body portion 48 and draw the locking clip 46 back through the locking clip apertures 42 and 44 in the lid 4 and base 6.

The locking clip may be formed of any resilient plastic or metal which is pliable enough to allow for the operation of the resilient member without breaking. For example, when made of plastic, the locking clip may be formed by a plastic extrusion process into a mold. Alternatively, a plastic locking clip may be die cut from a sheet of plastic, heated and shaped accordingly. A metal clip may be formed, for example, by a die cut and shaping process. Methods and materials for forming appropriate resilient plastic and metal members which meet the requirements of this invention are known in the art and will be clear to those of ordinary skill in the art.

Figure 9:
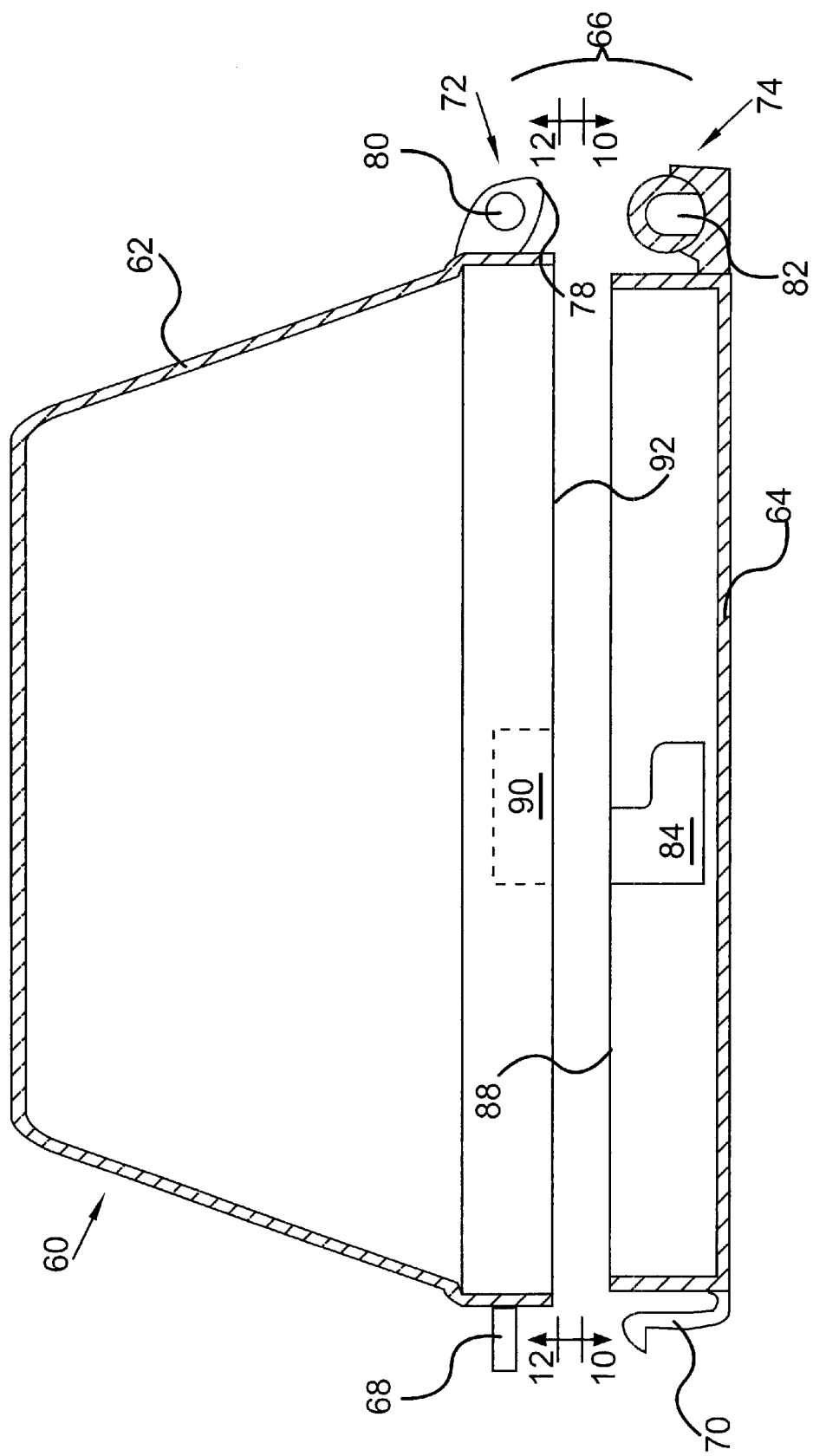
FIG. 9 is a side view of a separated lid and base of a bubble cover plate configured according to an embodiment of the invention.
Figure 15:
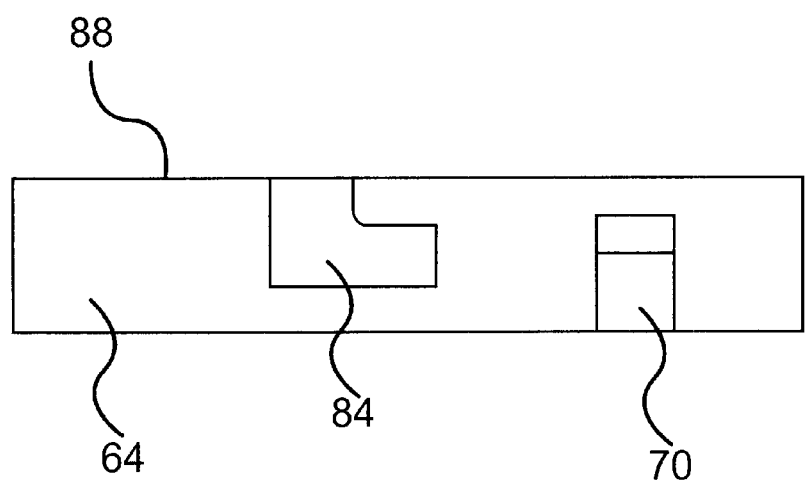
FIG. 15 is an end view of the base of FIG. 10 as seen along view lines 15—15 of FIG. 10.
Figure 12:
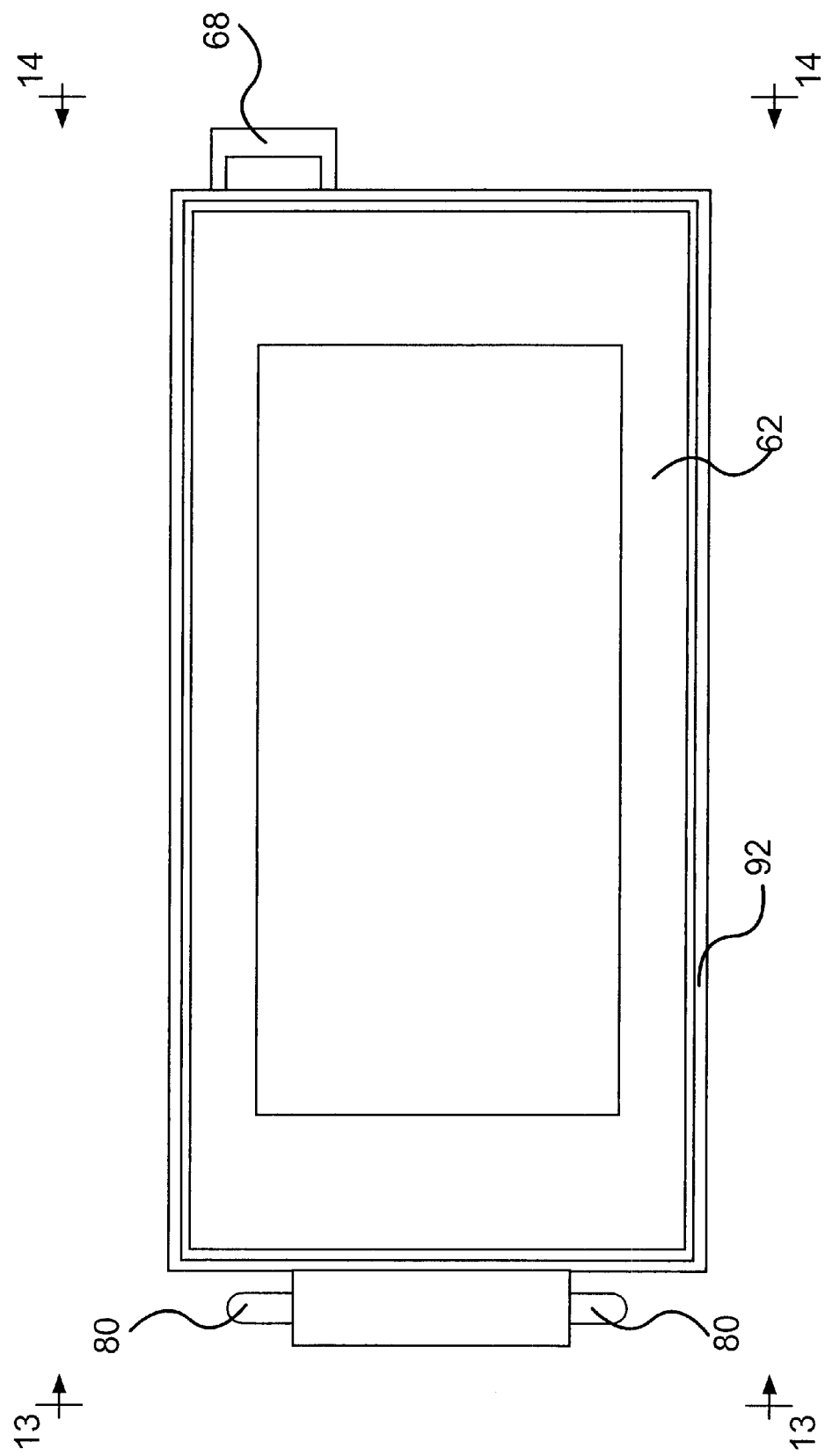
FIG. 12 is an view of the lid of FIG. 9 as seen along view lines 12—12 of FIG. 9.
Figure 13:
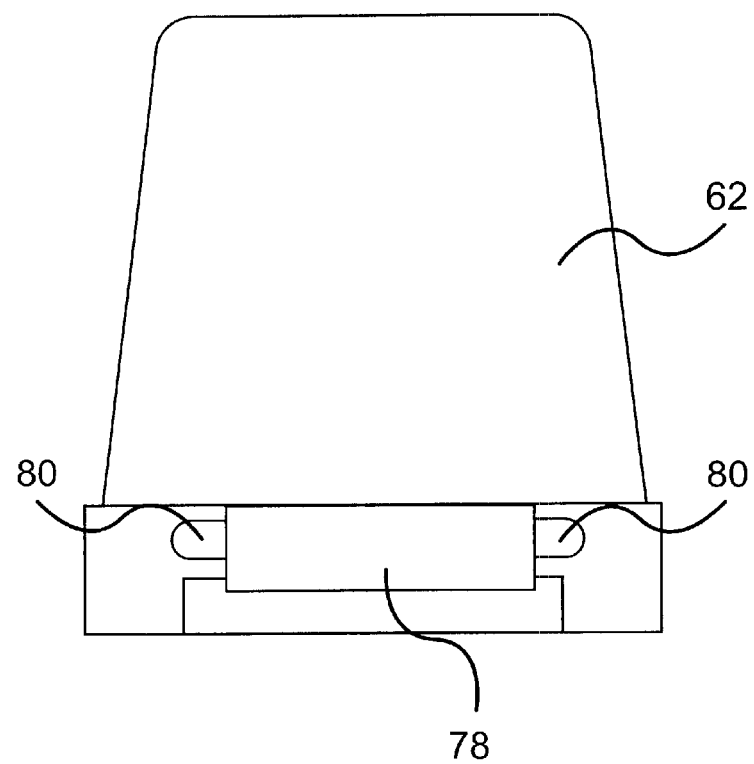
FIG. 13 is an end view of the base of FIG. 9 as seen along view lines 13—13 of FIG. 12.
Figure 16:
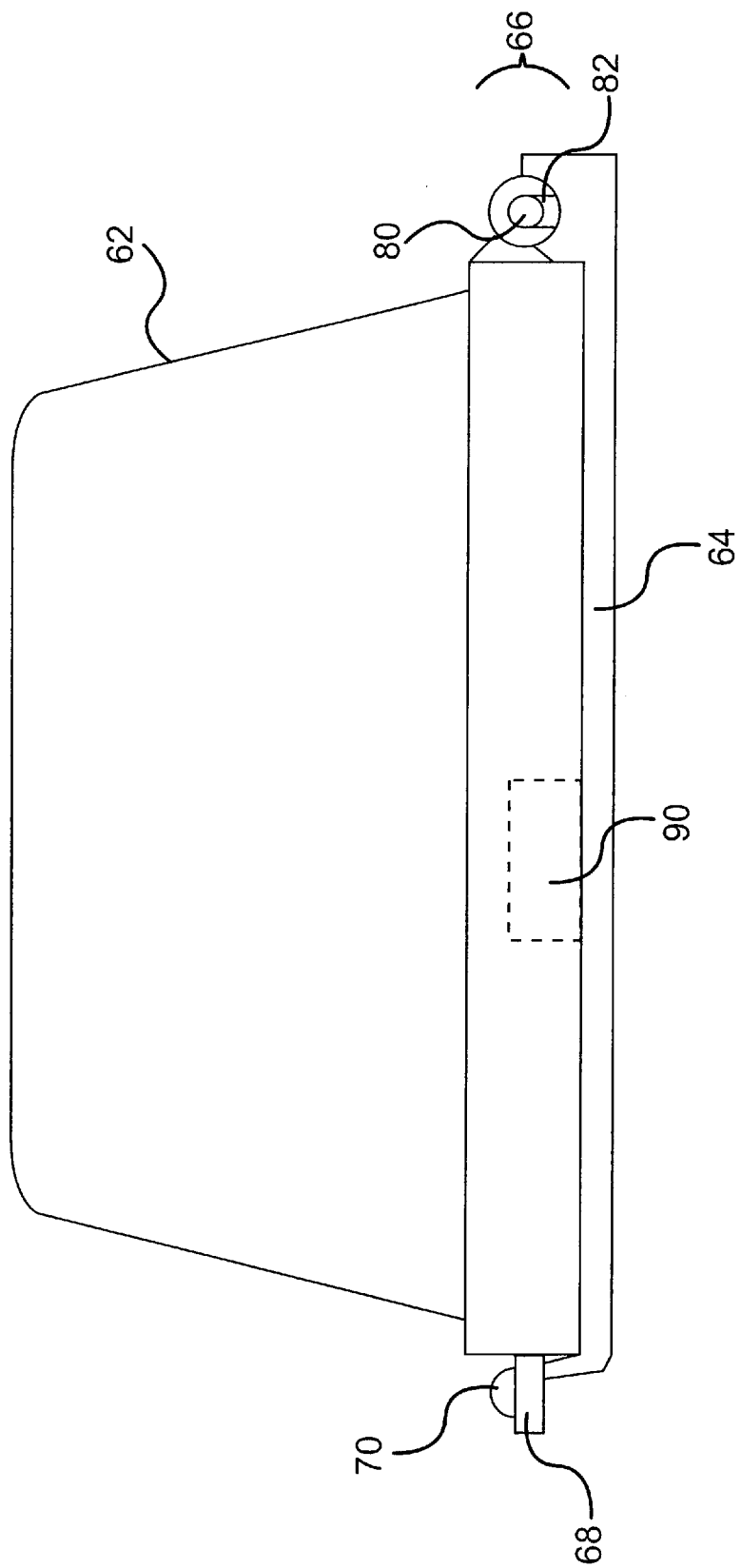
FIG. 16 is an assembled side view of the cover plate of FIG. 9.

FIGS. 9–16 illustrate an embodiment of a weatherproof bubble cover plate 60 which is mountable in both horizontal and vertical orientations. The bubble cover plate 60 includes a lid 62 and a base 64 ordinarily coupled by a biased hinge 66 as shown in FIG. 16. The biased hinge 66 of FIG. 9 is shown uncoupled for clarity. Conventional weatherproof bubble cover plates do not have biased hinges because the lids of conventional weatherproof bubble cover plates are generally approved only for and are installed only in an orientation with the hinge at the top and the lid is sufficiently heavy to close the lid. Conventional bubble cover plates often also include clasp members, such as clasp members 68 and 70, to clasp the bubble cover closed when the weight of the lid forces it shut. For embodiments of the invention which include a biased hinge 66, clasp members 68 and 70 may be included for additional assurance that the lid 62 will remain closed against the base 64, but are not needed to maintain the lid 62 closed in a weatherproof manner.

Figure 10:
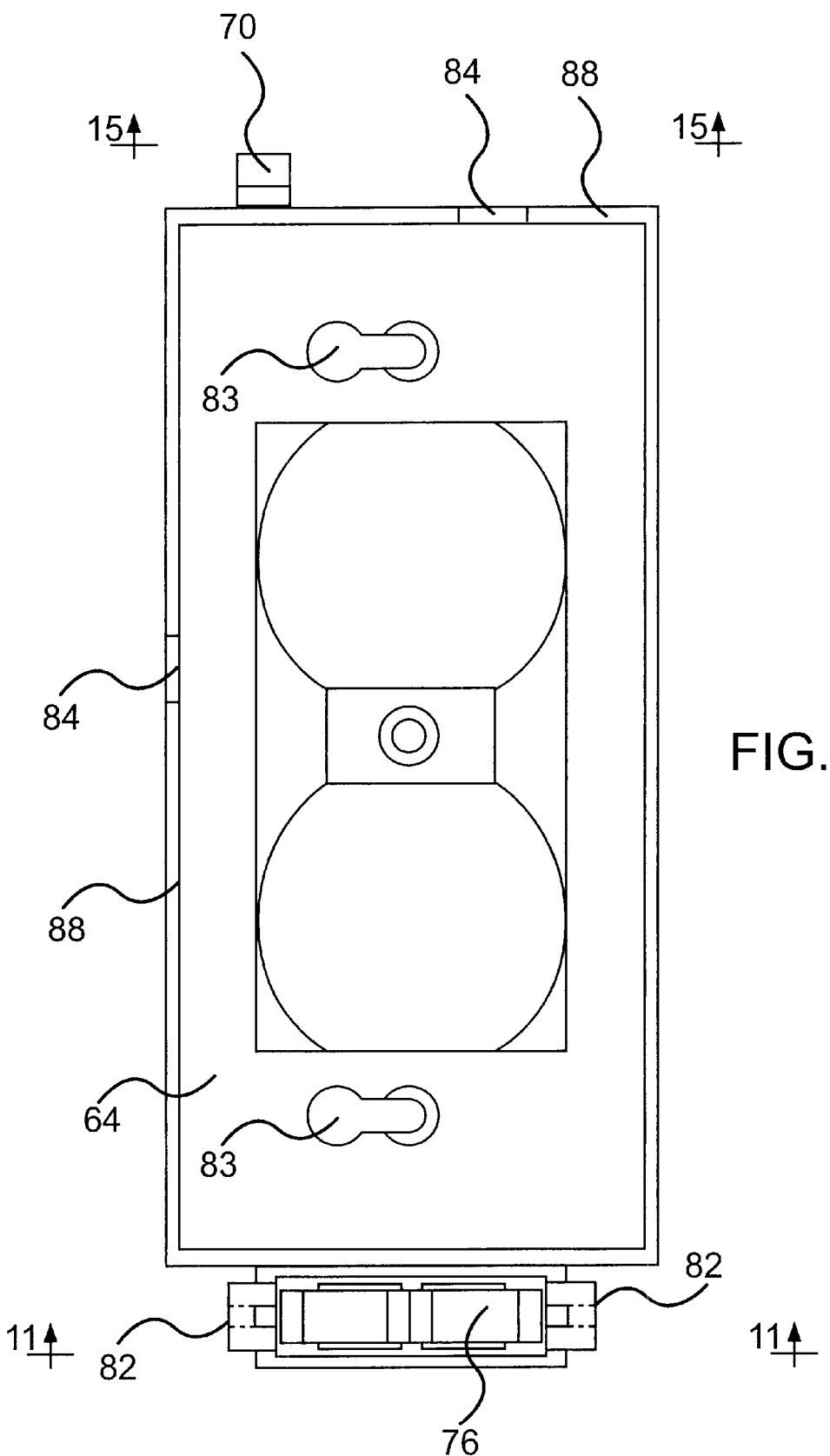
FIG. 10 is a top view of the base of FIG. 9 as seen along view lines 10—10 of FIG. 9.
Figure 11:
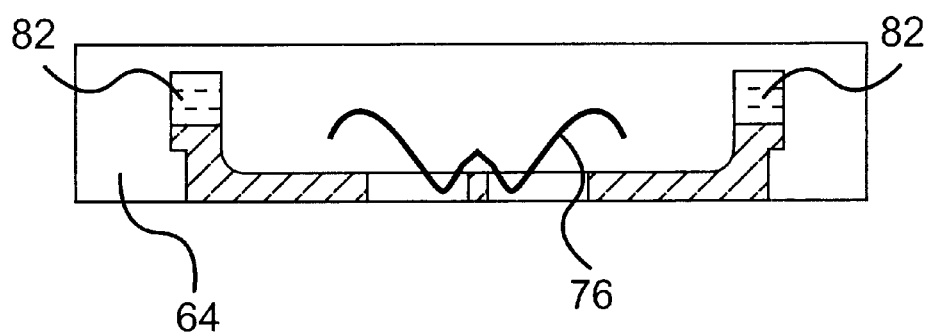
FIG. 11 is an end view of the base of FIG. 10 as seen along view lines 11—11 of FIG. 10.

The biased hinge 66 of the bubble cover plate 60 embodiment shown in FIGS. 9–16 includes lid hinge elements 72 and base hinge elements 74. As best illustrated in FIGS. 10 and 11, similar to the hinge bias elements 36 of the embodiment shown in FIGS. 3 and 4, the hinge bias element 76 of the bubble cover plate 60 biases the hinge bias bar 78 of the lid hinge elements 72 causing the lid to pivot about an axis through the hinge pivots 80 when the hinge pivots 80 are seated in the base pivot seats 82. Because the lid 62 of the bubble cover plate 60 is larger and often heavier than that of a flat cover, it may be necessary to use a stronger bias element 76 to close the lid 62 in a horizontal orientation. The specific strength of the spring necessary to close the lid in a horizontal orientation may be readily determined by one of ordinary skill in the art for the specific design of a particular cover plate. Additionally, while only a single bias element 76 is shown for the embodiment of FIGS. 9–16, it should be understood that additional or alternative bias elements may be used for a particular application. Some of these were set forth in the prior description of possible biasing elements of the flat weather weatherproof cover plate.

Also similar to the embodiment of the flat cover plate shown in FIGS. 1–5, the base 64 of the bubble cover plate 60 includes mounting screw apertures configured as keyhole slots 83, and apertures and knockouts for adapting the base 64 for either a duplex outlet or a GFCI outlet. It will be understood by those of ordinary skill in the art that for embodiments of either the flat or bubble covers the bases may be configured for use with a single type of outlet or device, or may be configured for use with a plurality of outlets or devices depending upon the desired application. The embodiments shown should not be construed to limit the application of the novel principles of the invention to particular types of outlets or devices.

The base 64 of the bubble cover plate 60 further includes a cord catch 84 positioned along an upper lip 88, or ridge of the base structure 64 so that a cord may be placed in the cord catch 84 to allow the cord to be plugged into a receptacle or otherwise attached to an electronic device installed within the cover plate 60 when the lid is closed. For stiff cords which do not bend easily when confronted with the lid closing, a removable knockout tab 90 may be positioned along a lip 92, or ridge of the lid 62. In particular embodiments of the invention, the removable knockout tab 90 covers the cord catch 84 when the lid is in its closed position (see FIG. 16). This allows the cover to remain weatherproof for various installed orientations of the cover plate.

Figure 14:
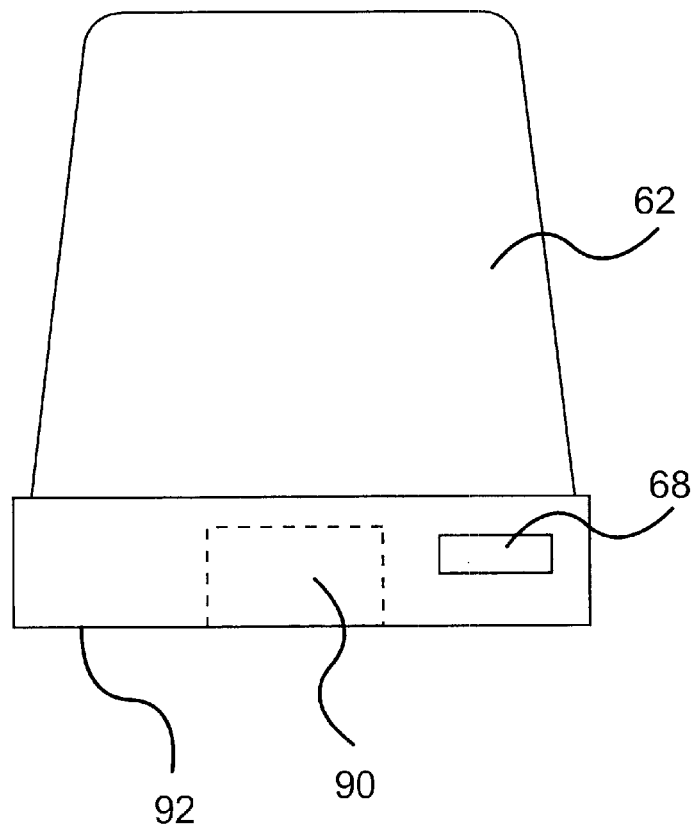
FIG. 14 is an end view of the base of FIG. 9 as seen along view lines 14—14 of FIG. 12.

As shown in FIGS. 14 and 15, embodiments of the invention may include a removable knockout tab 90 and corresponding cord catch 84 on a second adjacent side of the lid 62 and base 64 of the cover plate 60 in addition to the removable knockout tab 90 on a first side. By including removable knockout tabs 90 and cord catches 84 on adjacent sides of the cover plate 60, the weatherproof nature of the cover plate 60 may be maintained in either the horizontal or vertical orientation of the cover plate 60 by removing a knockout tab 90 on the underside of the cover plate 60 after the cover plate 60 is installed.

Figure 17:
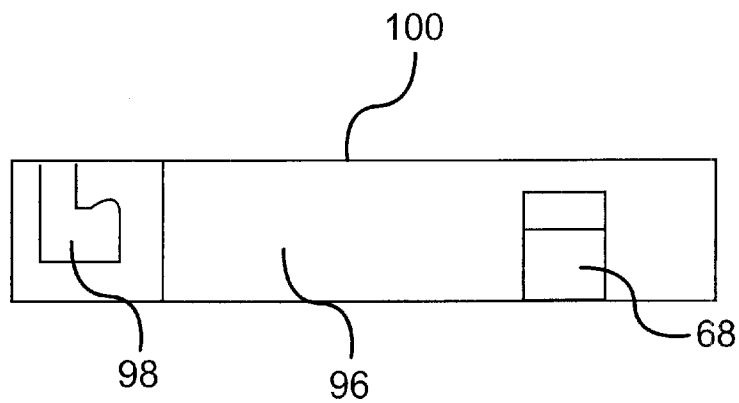
FIG. 17 is an end view of a base of a bubble cover plate with a flattened corner similar to the view of FIG. 15.
Figure 18:
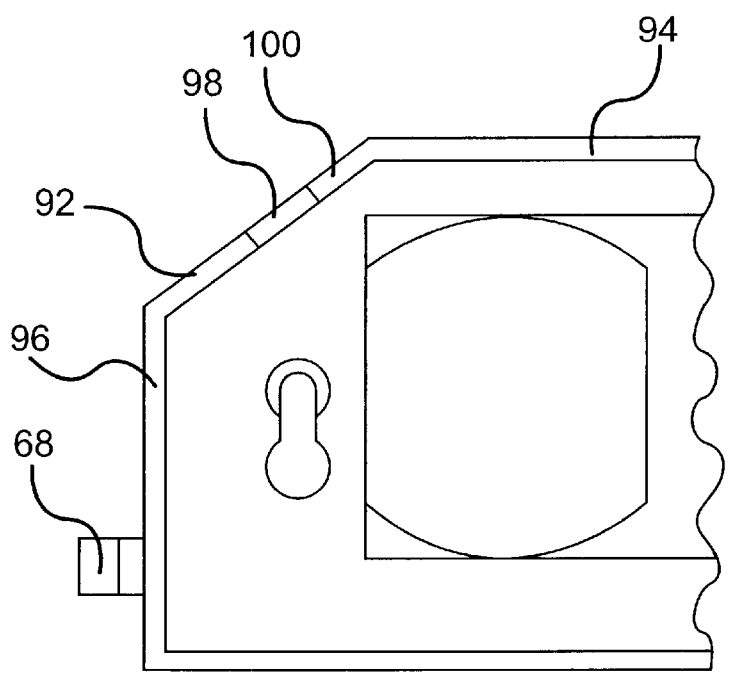
FIG. 18 is a top view of a portion of the base of FIG. 17.
Figure 19:
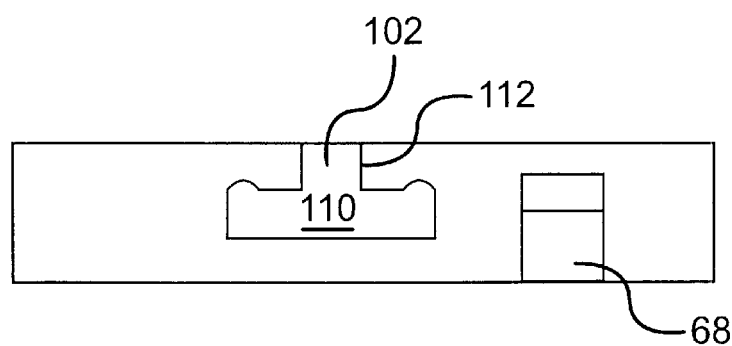
FIG. 19 is an end view of a base of a bubble cover plate similar to the view of FIG. 15, the base using a T-shaped cord catch.

Additional or alternative removable knockout tabs and cord catches may be used in the base and lid to accommodate cord access to the closed cover plate from various locations or for multiple access points. For example, as illustrated in FIGS. 17 and 18, a base may be configured to have a flattened corner 92 adjoining two adjacent sides 94 and 96, the flattened corner 92 having a cord catch 98 disposed along a lip 100, or upper ridge, thereof. With the cord catch 98 on a flattened or other-shaped corner 92, the cover plate may be installed in either a horizontal or vertical orientation using a single cord catch opening. Alternatively, a differently shaped cord catch may be used to accommodate multiple cords, or merely provide more space for a single cord. For example, as shown in FIG. 19, a T-shaped cord catch 102 may be used and accommodate a cord in each branch of the T. Furthermore, similar to the cord catch 98 shown in FIG. 17, the cord catch may be a backwards J-shaped cord catch to assist in holding the cord in the catch. Embodiments of the invention may include cord catches of varying orientations and shapes such as a forward J, backward L, and a U-shaped cord catch. Additionally, a cord catch of any embodiment of the invention may further include a knock-out section 110 therein which is integrally formed with the base but includes a thinned region 112 therearound, similar to knock-out sections 90 included in the lid 62. These cord catch knock-out sections 110 may then be used to provide additional protection until it is desired to pass a cord through the cord catch. The thinned region 112 allows for removal of the knock-out section 110 similar to the knock-out tabs 26 of the base shown in FIG. 4.

Of course, for any of the various embodiments, the lid of the cover plate would need to be configured to match the shape of the cover plate, and a corresponding removable knockout tabs in the lid to cover any cord catches in the base may be desirable. Additionally, other gaskets may be used to increase the weatherproof characteristics of a bubble cover plate. For example, a gasket may be used between the base and the lid to further restrict water from entering a closed cover plate, a gasket may be positioned near the hinge area to prevent water from entering gaps along the hinge area, and a gasket may be provided in a cord catch 84 to create a flexible seal around a cord passing therethrough.

The cover plate lids and bases for either the flat cover plate or bubble cover plate embodiments may be formed of either metal, plastic or other material by well known processes. Gaskets for cover plates may be formed of a resilient water resistant material such as foam, rubber, silicon and the like, and may be optionally adhered to the lid or other surface by any adhesive known in the art. The biasing members may be formed of a resilient material such as spring steel which may be formed into a shape and has properties for maintaining the shape or quickly returning to it when counter-biased.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A cover plate for a duplex outlet, the cover plate comprising:

a base having at least one box mounting screw aperture therethrough for mounting the base to a duplex outlet box;

a lid coupled to the base by a hinge and comprising an opening therethrough to access the box mounting screw aperture.

2. The cover plate of claim 1, wherein the base comprises a continuous ridge thereon surrounding an opening in the base for an outlet.

3. The cover plate of claim 2, further comprising a gasket between the lid and the base such that when the lid is in a closed position, the lid presses the gasket against the continuous ridge on the base.

4. The cover plate of claim 3, wherein the continuous ridge is positioned on the base inward with respect to the mounting screw aperture such that when the gasket is pressed against the continuous ridge on the base, the outlet opening is isolated from the opening in the lid.

5. A bubble cover plate for an outlet, the cover plate comprising a base and a bubble lid coupled to the base by a biased hinge which biases the lid into a closed position.

6. The cover plate of claim 5, wherein the base and lid are mountable on a box in a vertical and in a horizontal configuration.

7. A bubble cover plate for an outlet, the cover plate comprising a base and a bubble lid coupled to the base by a biased hinge which biases the lid into a closed position, wherein the lid comprises at least one knock-out positioned on a lip of the lid.

8. The cover plate of claim 7, wherein the base comprises at least one opening along a lip thereof and the at least one knock-out positioned on the lip of the lid is aligned with the at least one opening in the base lip.

9. The cover plate of claim 8, wherein the opening in the base lip is covered by the knock-out in the lid when the lid is in its closed position.

10. A bubble cover plate for an outlet, the cover plate comprising a base and a bubble lid coupled to the base by a biased hinge which biases the lid into a closed position, wherein the base comprises at least one opening along a lip thereof.

11. The cover plate of claim 10, wherein the opening is an L-shaped opening.

12. The cover plate of claim 10, wherein the opening is a T-shaped opening.

13. The cover plate of claim 10, wherein the base is generally rectangular in shape having a flattened corner, and the at least one opening is positioned along the lip at the flattened corner.

14. The cover plate of claim 10, wherein the base comprises a first opening along a lip of a first side, and a second opening along a lip of a second side adjacent to the first side.

* * * * *